UNITED STATES PATENT OFFICE.

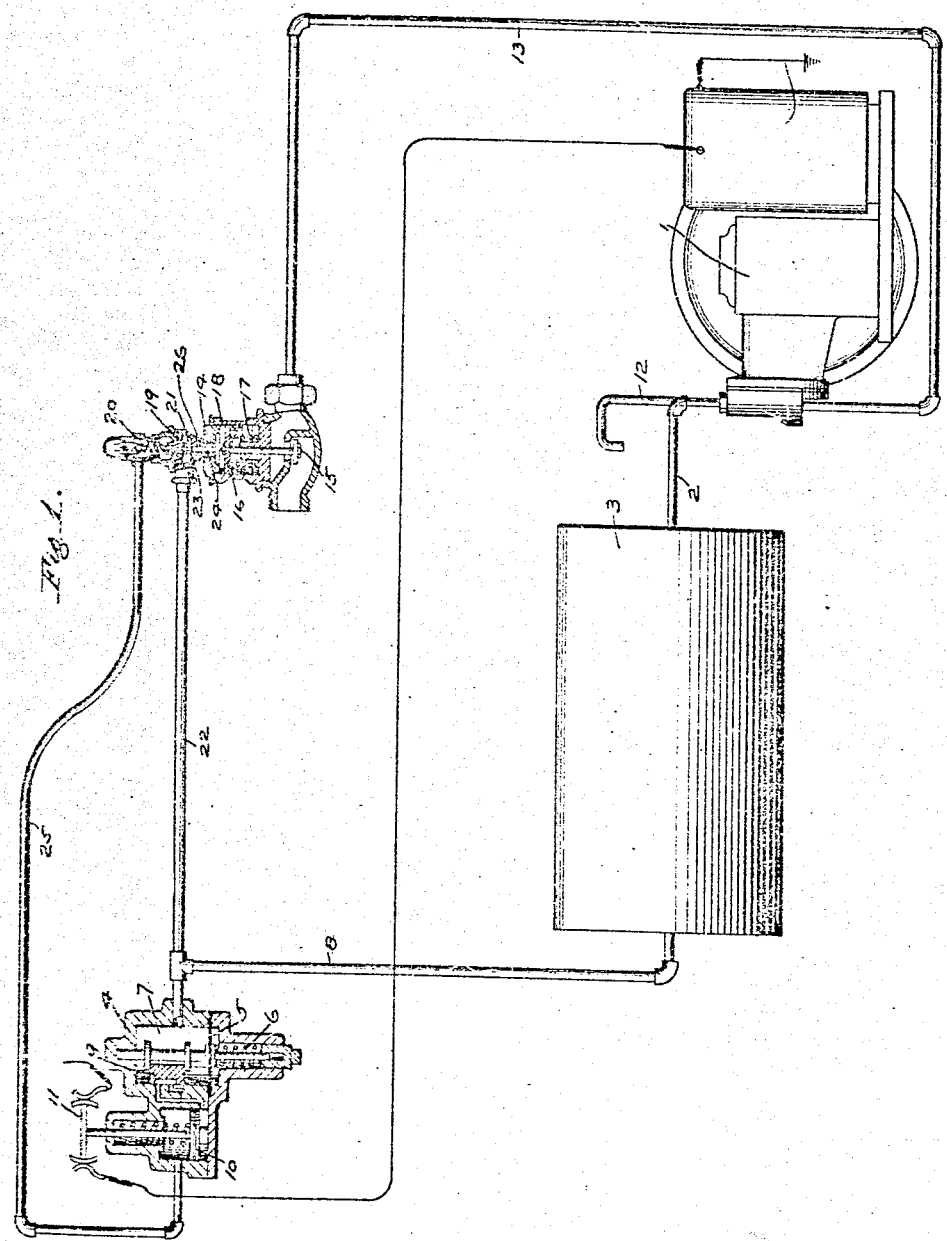

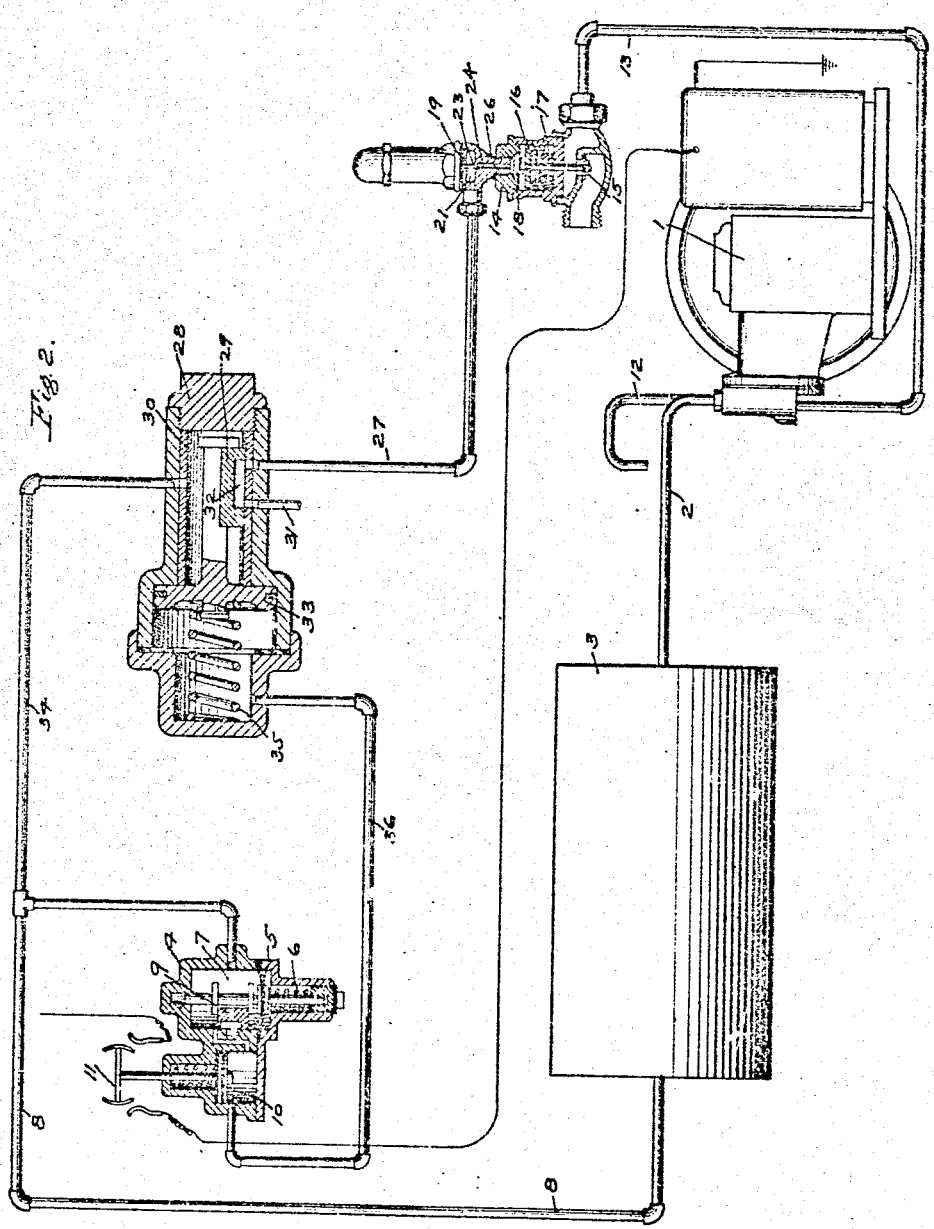

WALTER V. TURNER, OF EDGEWOOD, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

CONTROL-VALVE FOR WATER-JACKETED PUMPS.

985,864.     Specification of Letters Patent.     Patented Mar. 7, 1911.

Application filed August 3, 1908. Serial No. 446,536.

*To all whom it may concern:*

Be it known that I, WALTER V. TURNER, a citizen of the United States, residing at Edgewood, in the county of Allegheny and State of Pennsylvania, have invented new and useful Improvements in Control-Valves for Water-Jacketed Pumps, of which the following is a specification.

This invention relates to devices for controlling the supply of cooling water to water jacketed pumps, and more particularly to a construction of this character adapted for motor-driven air compressors.

It has heretofore been proposed to provide a water control device adapted to open the water supply valve or close same according as the pump governor operates to cut the pump into or out of action, so as to prevent an unnecessary waste of water while the pump is not operating. Constructions of this character are however subject to the fault that whenever from any cause the electric current is not available to start the motor and pump when the governor shifts to the cut in position, the water control device is nevertheless operated to open the water valve, so that a flow of water around the water jacket of the compressor follows which entails a corresponding waste of water.

The principal object of my invention is to provide a water controlling device having means for automatically cutting off the flow of water to the pump at such times as the pump is not able to respond to the action of the governor. For this purpose I contemplate the employment of means operating independently of the governor upon a certain reduction in pump pressure less than the cutting in pressure, to cut off the flow of water to the water jacket.

In the accompanying drawings, Figure 1 is a diagrammatic view of an electric motor air compressor equipment showing one form of my improvements applied thereto, and Fig. 2 a similar view with another construction of my invention applied thereto.

According to Fig. 1 of the drawings the equipment may comprise an electric motor driven air compressor 1 connected by a pipe 2 to a reservoir 3, into which the pump 1 compresses air. An electric pump governor 4 is provided having the usual regulating diaphragm 5, subject on one side to the pressure of an adjustable spring 6 and having the chamber 7 on the side of the diaphragm opposite to the spring connected by a pipe 8 to the reservoir 3. The diaphragm 5 is adapted to actuate a valve 9 for controlling the admission and release of fluid under pressure to and from a piston 10 which controls an electric switch 11 for opening and closing the electric circuit for the compressor motor. The water jacket of the compressor 1 is provided with the usual overflow pipe 12 and a water supply pipe 13. According to my invention the water supply pipe 13 is connected to water control valve device 14, comprising a valve 15 for controlling the admission of water from a source of supply to the supply pipe 13, the valve being operated by means of a piston 16 which is subject on one side to the pressure of a coil spring 17 and is actuated by varying the fluid pressure on the opposite side thereof. For the purpose of controlling the admission of fluid under pressure to the fluid pressure chamber 18 of the piston 16 a pressure diaphragm 19 is provided which is subject on one side to the pressure of an adjustable spring 20 and having the chamber 21 on the opposite side connected by a pipe 22 with the reservoir 3. The diaphragm 19 operates a valve 23 which governs a port 24 for establishing communication from the chamber 21 to the piston chamber 18. The spring chamber of the diaphragm 19 is connected by a pipe 25 with the piston chamber of the governor so that when the piston is in its cut out position the pipe 25 is open to fluid pressure below the piston, while in its cut in position, the port opening of pipe 25 is above the piston and consequently open to the atmosphere. The tension of the spring 20 is adjusted to a few pounds less pressure than the cutting in pressure at which the pump governor 4 is adjusted; for example, with the cutting in pressure 75 pounds the spring 20 may be set to 72 pounds. When the pressure in the reservoir falls to 75 pounds the governor operates the switch 11 and the compressor motor is cut in. In the cut in position of the governor the pipe 25 opens above the piston 10 to the atmosphere, so that the fluid pressure in the spring chamber of the diaphragm 19 is reduced to atmospheric pressure through the pipe 25 and the minimum reservoir pressure of 75 pounds on the opposite face of the diaphragm being greater than the pressure of the spring 20, the valve 23 is opened by the diaphragm and air from the reservoir 3 is admitted to the piston 16 which is thereupon actuated and opens the valve 15 to supply water through the pipe 13 to the water jacket of the pump. Upon the pressure in the reservoir attaining the cutting out degree the valve 9 of the pump governor is shifted and fluid under pressure is admitted to the actuating piston 10, shifting same to the cut out position. Fluid under pressure is likewise admitted to the pipe 25 and thence flows to the spring chamber of the diaphragm 19, and this fluid pressure in addition to the pressure of the spring causes the diaphragm to shift and seat the valve 23. The fluid pressure in the chamber 18 then bleeds down through a very small vent port 26, so that the spring 17 acts to shift the piston 16 and seat the water control valve 15, thus cutting off the flow of water to the water jacket of the pump. If it should happen upon the reduction of reservoir pressure to 75 pounds and the consequent actuation of the governor to the cut in position, that the compressor motor does not start up, as where there is no current supply, then the water valve will remain open only so long as the fluid pressure in the reservoir and in chamber 21 is in excess of the pressure of the spring 20, since upon the reservoir pressure reducing to slightly less than 72 pounds the spring operates to close the valve 23 and thereby cause the piston 16 to seat the water control valve 15 and cut off the flow of water.

In the construction illustrated in Fig. 2 the equipment is shown substantially as in Fig. 1, but in this case the diaphragm 19 is operated by varying the fluid pressure on the diaphragm in the chamber 21, the opposite side thereof being subject only to the pressure of an adjustable spring. According to this mode of operation, I connect the chamber 21 by a pipe 27 to a valve device 28, said valve device comprising a slide valve 29 adapted in one position to connect the port opening of pipe 27 to the valve chamber 30 and in another position to connect same to an exhaust port 31 by way of a cavity 32 in the valve. A piston 33 is provided for operating the valve 29, constantly subject to reservoir pressure on the valve chamber side, the valve chamber being connected by a pipe 34 to the reservoir 3, and on the opposite side to the pressure of a spring 35. The spring chamber of the piston 33 is connected by pipe 36 with the piston chamber of the switch actuating piston 10, so that the port opening of the pipe is on one side or the other of the piston, according as the same is in the cut out or cut in position. It will now be seen that when the pump governor is in the cut out position, as shown in the drawing, fluid under pressure is admitted through pipe 36 to the spring chamber side of piston 33, so that the opposing fluid pressures on opposite side of the piston are equal and consequently the spring 35 acts to shift the piston 33 and the valve 29 inwardly thereby connecting the pipe 27 through cavity 32 with exhaust port 31. The fluid under pressure being thus vented from diaphragm chamber 21, the diaphragm spring acts to close the valve 23 and thus cut off the admission of fluid under pressure to the piston 16. The leakage of fluid from the chamber through the small port 26 permits the spring 17 to actuate the piston 16 and valve 15 so as to cut off the flow of water to the pump. Upon operation of the pump governor to cut in the pump, the spring chamber of piston 33 is vented to the atmosphere through pipe 36, and thereupon, the fluid pressure on the valve chamber side of piston 33, being in excess of the pressure of spring 35 shifts the piston 33 and slide valve 29 so that the port opening of pipe 27 is uncovered to the valve chamber 30 and fluid under pressure is admitted to the diaphragm chamber 21. The pressure of the diaphragm spring being adjusted to three pounds or so less pressure than the cutting in pressure of the pump governor, as in the first described construction, so long as the reservoir pressure is at or above its normal minimum, when the governor cuts in the diaphragm 19 is actuated and opens the valve 23, so as to admit fluid under pressure to the piston 16 to operate the same and thus open the water control valve 15, but if the pressure in the reservoir drops below the cut in pressure so as to be less than the pressure of the diaphragm spring, which would be the case where the motor fails to respond to the pump governor cutting in, then the spring acts to close the valve 23 and cut off the admission of air to the piston 16. The piston 16 thereupon operates to close the water control valve 15 and cut off the admission of water to the water jacket of the pump.

It will now be apparent that by means of my improvements the waste of water is prevented at times when the pump is not working and the pump governor is in its cut in position, as soon as the pressure in the reservoir falls off a slight amount below the cutting in point of the governor.

Having now described my invention, what I claim as new and desire to secure by Letters Patent, is:—

1. The combination with a water jacketed pump for compressing fluid, of means governed by the starting and stopping of the pump for controlling the admission of water to the water jacket of the pump, said means being also adapted to cut off the admission of water upon a predetermined reduction in the pressure of the compressed fluid.

2. The combination with a pump provided with a water jacket, a receptacle into which the pump is adapted to compress fluid, a governor operating according to the degree of pressure in the receptacle for controlling the starting and stopping of the pump, of a valve mechanism operating upon starting the pump for admitting water to the water jacket of the pump and upon stopping the pump for cutting off the flow of water thereto and means for preventing the admission of water to the water jacket upon a predetermined reduction in pressure in said receptacle.

3. The combination with a water jacketed pump and a receptacle into which the pump compresses fluid, of a pump governor operating according to the degree of pressure of fluid in the receptacle for cutting said pump into and out of action, a valve mechanism operating according to the position of the governor for controlling the flow of water to the water jacket of the pump and means for cutting off the flow of water to the pump independently of the operation of the governor.

4. The combination with a pump having a water jacket and a reservoir for receiving the fluid compressed by the pump, of a governor operating at a predetermined reservoir pressure for cutting the pump into action, a valve mechanism operated upon movement of the governor to its cut in position for admitting water to the water jacket of the pump and means operated upon reduction of reservoir pressure to a degree less than the cutting in reservoir pressure while the governor is in the cut in position for cutting off the admission of water to the water jacket.

5. The combination with an electric motor driven air compressor having a water jacket and a governor adapted to make and break the electric motor circuit according to the degree of pump pressure to cut the compressor into and out of action, a valve mechanism operating when the governor cuts in the compressor to admit water to the water jacket of the compressor and means operating upon a predetermined reduction in pump pressure for cutting off the supply of water independently of the position of the governor.

6. The combination with a water jacketed pump adapted to compress fluid into a receptacle and a governor for the pump operated according to the degree of fluid pressure in the receptacle for starting and stopping the pump, of a valve device comprising a valve for controlling the flow of water through the water jacket of the pump and a movable abutment operated by fluid under pressure from the receptacle for actuating said valve device and means controlled by the governor for also actuating said valve device.

7. In a water controlling apparatus for water jacketed pumps, the combination with a governor operated according to the degree of pump pressure for cutting the pump into and out of action, of a valve for controlling the flow of water through the pump water jacket, an abutment subject on one side to pump pressure for operating said valve, a spring acting on the abutment to oppose the pump pressure, and means controlled by the pump governor for varying the fluid pressure on the spring side of said abutment to thereby operate said water controlling valve.

8. The combination with a pump adapted to compress air into a reservoir and provided with a water jacket, of means for controlling the flow of water through the water jacket of the pump and operated at one time upon an increase and at another time upon a decrease in reservoir pressure for cutting off the flow of water to said water jacket.

9. The combination with a water jacketed pump for compressing fluid and a governor for the pump, of a valve mechanism controlled by said governor for supplying water to the water jacket of the pump and means governed by the degree of pump pressure for also controlling said valve mechanism.

10. The combination with a water jacketed fluid compressor and a governor therefor, of a valve mechanism controlled by said governor for supplying water to the water jacket of the compressor and adapted to cut off the supply of water upon a predetermined reduction in the pressure of fluid compressed by the compressor.

In testimony whereof I have hereunto set my hand.

WALTER V. TURNER.

Witnesses:
R. F. EMERY,
WM. M. CODY.